(12) United States Patent
Conder

(10) Patent No.: US 10,251,321 B2
(45) Date of Patent: Apr. 9, 2019

(54) SHOVEL

(71) Applicant: Conder Holdings, LLC, South Jordan, UT (US)

(72) Inventor: Richard V. Conder, South Jordan, UT (US)

(73) Assignee: CONDER HOLDINGS, LLC, South Jordan, UT (US)

( * ) Notice: Subject to any disclaimer, the term of this patent is extended or adjusted under 35 U.S.C. 154(b) by 0 days.

(21) Appl. No.: 15/804,592

(22) Filed: Nov. 6, 2017

(65) Prior Publication Data

US 2018/0132412 A1    May 17, 2018

Related U.S. Application Data

(60) Provisional application No. 62/420,558, filed on Nov. 11, 2016.

(30) Foreign Application Priority Data

May 23, 2017    (CN) .......................... 2017 1 0368125

(51) Int. Cl.
   *A01B 1/02*     (2006.01)
   *B65B 67/12*    (2006.01)

(52) U.S. Cl.
   CPC .......... *A01B 1/026* (2013.01); *B65B 67/1238* (2013.01)

(58) Field of Classification Search
   CPC ............................ A01B 1/026; B65B 67/1238
   See application file for complete search history.

(56) References Cited

U.S. PATENT DOCUMENTS

| | | | |
|---|---|---|---|
| 1,167,782 A | | 1/1916 | Richards |
| 1,182,412 A | | 5/1916 | Olesberg |
| 1,234,057 A | | 7/1917 | McIntyre |
| 1,477,930 A | * | 12/1923 | Bartholomew ......... F24B 15/04 126/243 |
| 1,847,476 A | * | 3/1932 | Fuhr ..................... F24B 13/008 15/257.1 |

(Continued)

FOREIGN PATENT DOCUMENTS

CN     206686524 U    12/2017

OTHER PUBLICATIONS

International Search Report for PCT Application PCT/IB2017/056801 dated Mar. 8, 2018.

(Continued)

*Primary Examiner* — Stephen A Vu
(74) *Attorney, Agent, or Firm* — Thomas | Horstemeyer, LLP

(57) ABSTRACT

There is provided a shovel apparatus including a body with a bottom and two sides. Each side is fixedly coupled to a side edge of the bottom, and includes a front and a back adjacent to a front edge and a back edge of the bottom, respectively. A first handle is coupled to each side. A second handle is coupled to each side and extends past the back of each side and away from the shovel apparatus. The shovel apparatus is sized to hold the bag or sack in an open position for filling and the shovel apparatus has a length less than a length of the bag or sack such that when the shovel apparatus is inserted in the bag or sack, the second handle touches near a bottom of the bag or sack and the first handle is near a top of the bag or sack.

20 Claims, 12 Drawing Sheets

ENLARGED VIEW

(56) References Cited

U.S. PATENT DOCUMENTS

| | | | |
|---|---|---|---|
| 3,026,138 A * | 3/1962 | Benjamin | A01K 39/01 |
| | | | 294/178 |
| 5,129,609 A | 7/1992 | Tobin | |
| 8,100,452 B1 | 1/2012 | Homewood | |
| 2005/0035611 A1 * | 2/2005 | Agazzi | A47F 13/08 |
| | | | 294/178 |
| 2011/0285158 A1 * | 11/2011 | Workman | A47F 13/08 |
| | | | 294/178 |

OTHER PUBLICATIONS

Written Opinion for PCT Application PCT/IB2017/056801 dated Mar. 8, 2018.

* cited by examiner

SECTION A-A'

SIDE VIEW

END VIEW

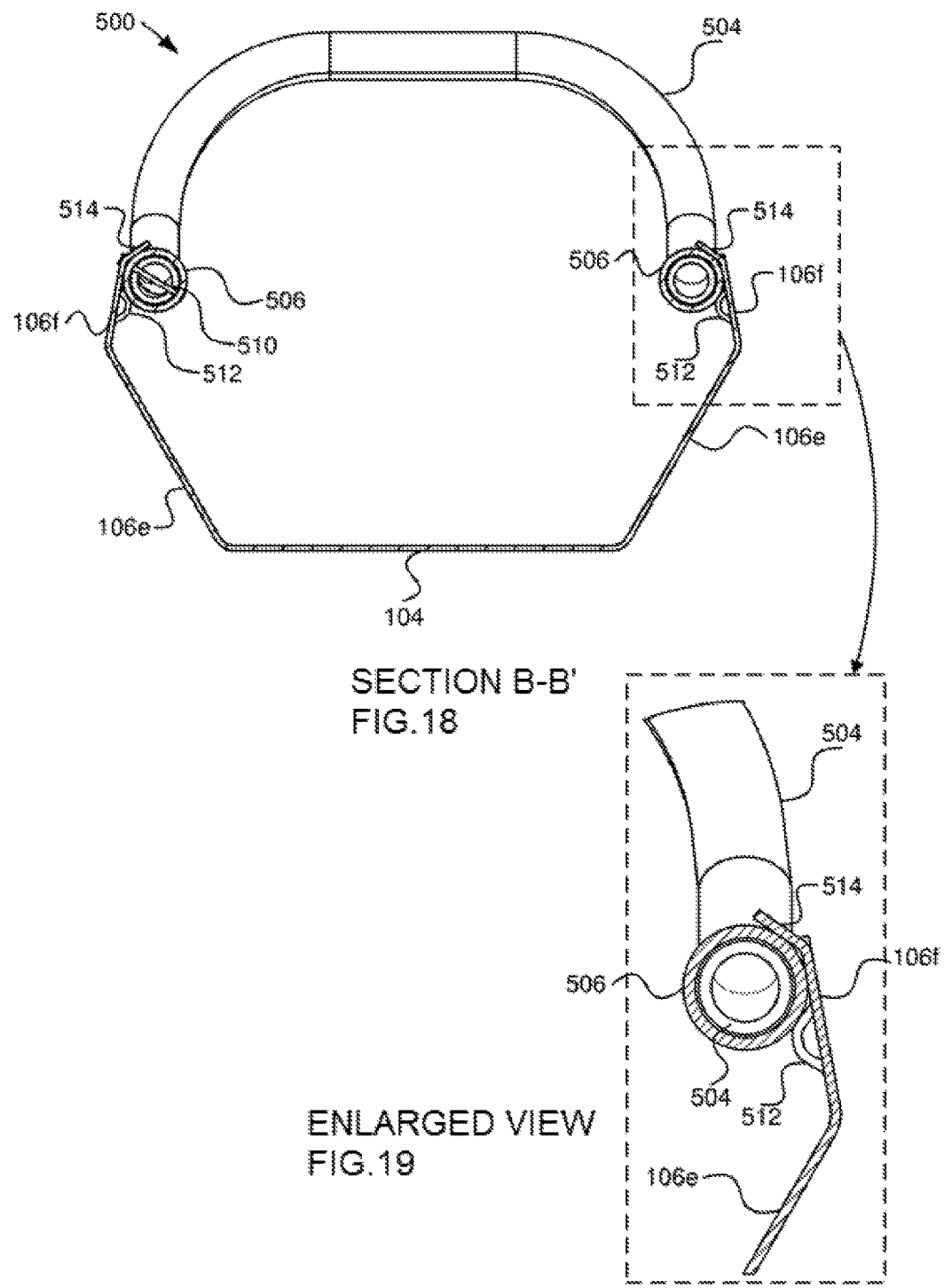

SHOVEL

CROSS REFERENCE TO RELATED APPLICATIONS

This application claims priority to, and the benefit of, co-pending CN Application No. 201710368125.3, filed May 23, 2017 and U.S. provisional application having Ser. No. 62/420,558, filed Nov. 11, 2016, both of which are herein incorporated by reference in their entireties.

FIELD

The present disclosure relates generally to methods and apparatuses for filling bulk particulate matter into flexible receptacles such as bags or the like.

BACKGROUND

Sudden needs to produce large quantities of particulate filled flexible sacks or bags from a central storage location or caches can occur often without the necessary time or infrastructure to create permanent processing solutions.

For example, large numbers of sandbags are used each year to protect property from the harmful flooding occurring in and around oceans, rivers, lakes and other waterways when faced with a sudden prospect of flooding.

In other situations, bulk particulate material mounds or stores of grains, fertiliser, silage and the like may also need to be repacked for ease of handling/transportation from a central location to another place. Cost, location or other constraints may require filling particulate material into the bags or sacks to be performed without the construction of automatic filling stations or permanent infrastructure.

Bags or sacks may typically prepared by manually filling each bag using a shovel or other manual device. It would be appreciated that this approach is quite slow and labor intensive, typically requiring one person to hold the sack or bag and another to shovel the particulate material. Using this approach means that a large number of workers produce only a relatively modest number of filled bags. Particularly in relation to filling sand bags, the need for filling the bags or sacks can arise at multiple locations and under pressing time constraints.

SUMMARY

In a first broad aspect there is provided a shovel apparatus comprising:
a body comprising: a bottom comprising side edges opposite each other, a front edge and a back edge distal to the front edge; and two sides, each side comprising a first side edge and a second side edge distal to the first side edge, each side fixedly coupled along the first side edge of the side to the side edge of the bottom, each side comprising a front located adjacent to the front edge of the bottom and a back located adjacent to the back edge of the bottom, wherein a portion of each side attached to the bottom extends upward away from the bottom. A first handle is coupled to each of the sides, and a second handle is coupled to each of the sides and extending past the back of the sides and away from the body. The first handle is spaced apart from the second handle and said first handle is connected towards the front of the shovel apparatus to extend away from the bottom of the shovel apparatus. The shovel apparatus is sized to fit in a bag or sack and to hold the bag or sack in an open position for filling.

Advantageously, the second handle extends from the sides at an angle between a plane perpendicular to the bottom and a plane parallel with the bottom, wherein the sides slope away from the second handle at an angle substantially similar to the angle that the second handle extends from the sides.

Optionally, the bottom comprises a notch on the back edge extending toward a center of the bottom, wherein the second handle, the sloping side and the notch form an opening.

Preferably, the handle, the slope of the sides and the notch in the bottom are shaped without edges to catch on a bag or sack when the shovel apparatus is inserted in the bag or sack.

Advantageously, the shovel apparatus is sized to fit in a bag or sack and hold an opening in the bag or sack in a substantially open position for filling.

Preferably, the shovel apparatus has a length less than a length of the bag or sack wherein when the shovel apparatus is inserted in the bag or sack, the second handle touches near a bottom of the bag or sack and the first handle is near a top of the bag or sack.

A top of the first handle distal to where the first handle may be connected to the sides and positioned over the bottom at a position behind a plane perpendicular to the front edge of the bottom and the front edge of the sides.

Advantageously, the front edge of the bottom and at least a portion of the front edge of the sides are straight and are aligned along a common plane.

Preferably, the bottom is substantially planar, and comprises one or more ridges shaped to stiffen the bottom.

Advantageously, the sides each comprise a lower section and an upper section, wherein each lower section is adjacent to the bottom and extends away from the bottom at an angle away from a plane perpendicular to where the sides attach to the bottom and each upper section angles toward the plane perpendicular to where the sides attach to the bottom.

Preferably each upper section comprises a front edge that slopes from a front edge of the lower section to toward the first handle.

Advantageously, one or more of the first handle and the second handle detach from the shovel apparatus.

Optionally, each of the first and second handle extend away from the bottom and are connected so the first handle is located forward toward a front of the shovel apparatus, wherein the sides slope away from the second handle at an angle substantially similar to the angle that the second handle extends from the sides, Advantageously, the shovel apparatus angles outward from rear to front to allow a first shovel apparatus to stack inside a second shovel apparatus.

Preferably, the first handle frames an opening formed by the bottom and sides for passage of particulate material therethrough when grasped by the user to scoop particulate material.

In a second broad aspect there is provided a shovel apparatus comprising:
a body comprising: a bottom comprising side edges opposite each other, a front edge and a back edge distal to the front edge, the bottom comprising one or more ridges shaped to stiffen the bottom; and two sides, each side comprising a first side edge and a second side edge distal to the first side edge, each side fixedly coupled along the first side edge of the side to the side edge of the bottom, each side comprising a front located adjacent to the front edge of the bottom and a back located adjacent to the back edge of the bottom, wherein a portion of each side attached to the bottom extends upward away from the bottom; a first handle coupled to each of the sides, and a second handle coupled to each of the sides and extending past the back of the sides and away from the shovel apparatus, the second handle extends from the sides at an angle between a plane perpendicular to the bottom and a plane parallel with the bottom, each of the first and second handle extend away from the bottom and are connected so the first handle is located forward toward a front of the shovel apparatus, wherein the sides slope away from the second handle at an angle substantially similar to the angle that the second handle extends from the sides, wherein the shovel apparatus is sized to fit in a bag or sack and to hold the bag or sack in an open position for filling, wherein the bottom comprises a notch on the back edge extending toward a center of the bottom, wherein the second handle, the sloping side and the notch form an opening, wherein the front edge of the bottom and at least a portion of the front edge of the sides are straight and are aligned along a common plane.

Advantageously, the bottom is substantially planar, and the sides each comprise a lower section and an upper section, wherein each lower section is adjacent to the bottom and extends away from the bottom at an angle away from a plane perpendicular to where the sides attach to the bottom and each upper section angles toward the plane perpendicular to where the sides attach to the bottom.

Optionally, one or more of the first handle and the second handle rotate to a position near the bottom facilitating stacking of two or more shovel apparatuses.

In a third broad aspect there is provided a shovel apparatus comprising:
a body comprising: a bottom comprising side edges opposite each other, a front edge and a back edge distal to the front edge; and two sides, each side comprising a first side edge and a second side edge distal to the first side edge, each side fixedly coupled along the first side edge of the side to the side edge of the bottom, each side comprising a front located adjacent to the front edge of the bottom and a back located adjacent to the back edge of the bottom, wherein a portion of each side attached to the bottom extends upward away from the bottom; a first handle coupled to each of the sides, and located forward toward a front of the shovel apparatus and extending away from the bottom, wherein a top of the first handle distal to where the first handle is connected to the sides is positioned over the bottom at a position behind a plane perpendicular to the front edge of the bottom and the front edge of the sides; and a second handle coupled to each of the sides and extending past the back of the sides and away from the shovel apparatus and extending from the sides at an angle between a plane perpendicular to the bottom and a plane parallel with the bottom, wherein the sides slope away from the second handle at an angle substantially similar to the angle that the second handle extends from the sides, wherein the shovel apparatus is sized to fit in a bag or sack and to hold the bag or sack in an open position for filling, wherein the sides each comprise a lower section and an upper section, wherein each lower section is adjacent to the bottom and extends away from the bottom at an angle away from a plane perpendicular to where the sides attach to the bottom and each upper section angles toward the plane perpendicular to where the sides attach to the bottom.

Advantageously, each upper section comprises a front edge that slopes from a front edge of the lower section to toward the first handle; and the shovel apparatus angles outward from rear to front to allow a first shovel apparatus to stack inside a second shovel apparatus.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the disclosure will be described and explained with additional specificity and detail through the use of the accompanying drawings, in which:

FIG. 18 is an end section view of the shovel apparatus with detachable handles of FIG. 14; and FIG. 19 is an enlarged view of a portion of the shovel apparatus with detachable handles of FIG. 18.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the disclosure may be combined in any suitable manner in one or more embodiments. In the following description, numerous specific details are provided, such as various handle positions, handle options, shapes, materials, sizes, etc., to provide a thorough understanding of embodiments of the disclosure. One skilled in the relevant art will recognize, however, that the disclosure may be practiced without one or more of the specific details, or with other methods, components, materials, and so forth. In other instances, well-known structures, materials, or operations are not shown or described in detail to avoid obscuring aspects of the disclosure.

Figure 1:
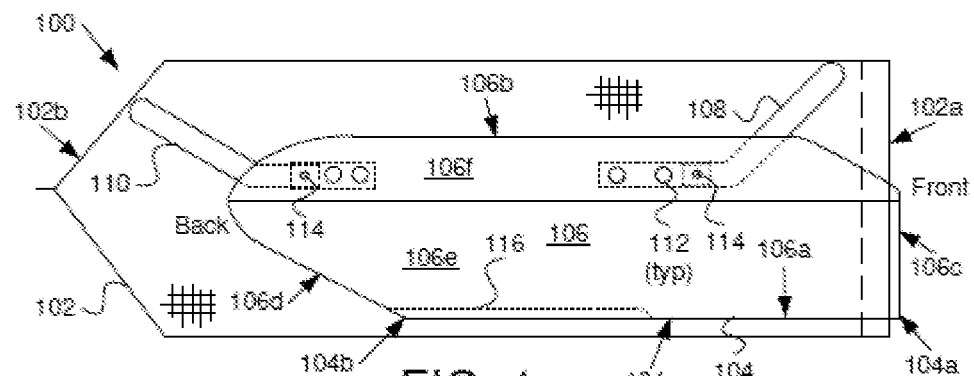
FIG. 1 is a side view illustrating one embodiment of a shovel apparatus with detachable handles.
Figure 2:
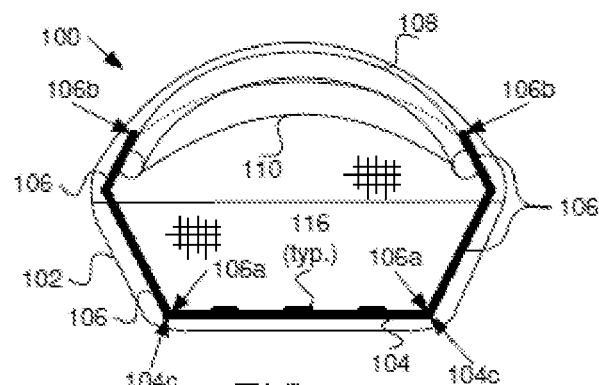
FIG. 2 is an end view further illustrating the shovel apparatus of FIG. 1.
Figure 3:
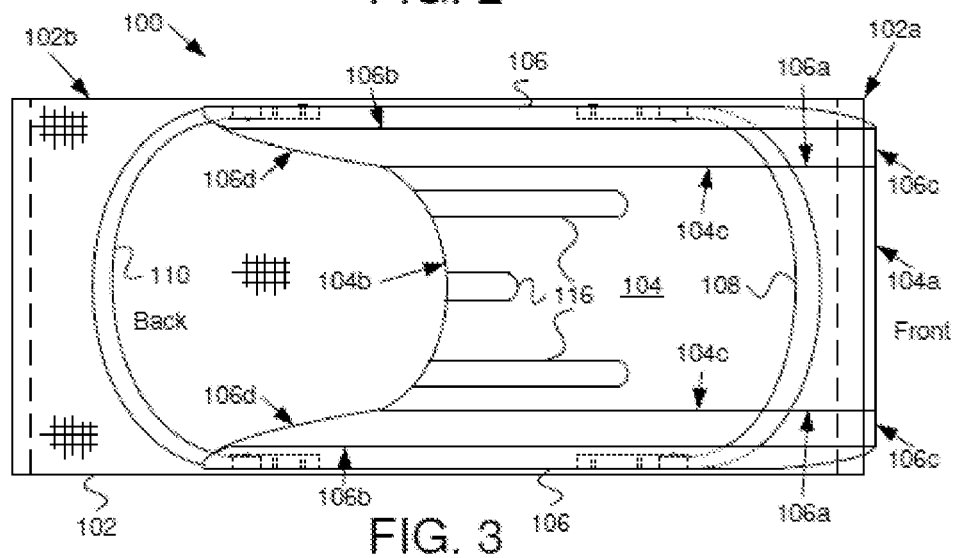
FIG. 3 is a top view further illustrating the shovel apparatus of FIG. 1.

FIG. 1 is a side view illustrating one embodiment of a shovel apparatus 100 with detachable handles. FIG. 2 is an end view further illustrating the shovel apparatus 100 of FIG. 1. FIG. 3 is a top view further illustrating the shovel apparatus 100 of FIG. 1.

The shovel apparatus 100 is depicted in a bag or sack 102 for filling with sand, one of skill in the art will recognize that the shovel apparatus 100 may be used to scoop dirt, rocks, gravel, water, wood, plastic, debris, or other material into a bag where the shovel apparatus 100 is sized and configured to hold the bag open while filling. It would further be appreciated that the shovel apparatus could be used to scoop bulk particulate flowable material such as grains, silage, fertilizer, landscaping supplies (such as dirt bark or mulch), snow etc into the bag or sack, where the shovel apparatus 100 is sized and configured to hold the bag open while filling.

The shovel apparatus 100 is depicted inside a bag or sack 102 with an opening 102a and a bottom 102b. The shovel apparatus 100 includes a bottom 104 and sides 106. The bottom 104 includes a front edge 104a, a back edge 104b distal to the front edge 104a, and side edges 104c opposite each other. The sides 106 each include a first side edge 106a fixedly coupled to a side edge 104c of the bottom. The sides 106 each include a second side edge 106b distal to the first side edge 106a. The sides 106 include a front edge 106c and a back edge 106d distal to the front edge 106c.

The shovel apparatus 100 includes a first handle 108 and a second handle 110 coupled to the sides 106. The first handle 108 is positioned near a front of the shovel apparatus 100 and extends away from the sides 106 and bottom 104 at an angle toward a front of the shovel apparatus 100. The angle, in one embodiment, is about 45 degrees. About 45 degrees, hereinafter, may include angles that are exactly 45 degrees and angles that are close to 45 degrees. For example, the angle may include a range from about 30 degrees to 60 degrees. In another embodiment, the first handle 108 extends across an opening between the sides 106 and does not extend above the sides (not shown). The first handle 108 may be shaped to allow a user to grasp the handle while providing an opening formed by the bottom 104, sides 106 and first handle 108 with the user grasping the handle so that sand can pass through the opening when the user scoops sand.

The first handle 108 is positioned to be forward toward the front of the shovel apparatus 100, as depicted in FIGS. 1 and 3. The first handle 108 is shaped to extend away from the bottom 104 and sides 106 to hold open a bag or sack 102. For example, the size and shape of the bottom 104, sides 106 and first handle 108 may be sized just smaller than the opening 102a of the bag or sack 102 so that the shovel apparatus 100 holds open the bag or sack 102 as much as possible while allowing the shovel apparatus 100 to fit in the bag or sack 102.

For example, for a particular circumference of the opening 102a of the bag or sack 102, the size and shape of the bottom 104, sides 106 and first handle 108 may have a circumference that is 5% smaller than the circumference of the opening 102a of the bag or sack 102. In another embodiment, the circumference of the bottom 104, sides 106 and first handle 108 may have a circumference that is within a range of 1% to 20% of the circumference of the opening 102a of the bag or sack 102. One of skill in the art will recognize other sizes and shapes of the bottom 104, sides 106 and first handle 108 to fit in a bag or sack 102 while holding the bag or sack 102 open for filling may be possible.

The first handle 108 is depicted as rounded in FIG. 2. In another embodiment, the first handle 108 may have straight sections, for example where the handle is grasped by a user, may be oblong, or other shape. The first handle 108 is also depicted to angle forward in FIGS. 1 and 3. In addition, the sides 106 each may be shaped with a lower section 106e and an upper section 106f where the lower section 106e angles up and away from the bottom 104 and then the upper sections 106f angle back toward a center of the shovel apparatus 100. The lower section 106e and the upper section 106f may be substantially planar, which facilitates the stiffness of the shovel apparatus 100.

As depicted in FIG. 1, the upper sections 106f may be angled back toward the first handle 108. For example, with the angled sections of the upper section 106f and the first handle 108 sloped forward toward the front of the shovel apparatus 100 (right side of FIGS. 1 and 3), a user may be able to more easily grasp the first handle 108 and wrap a portion of the bag or sack 102 around the first handle 108 to secure the bag or sack 102 to the shovel apparatus 100 while filling the bag or sack 102. In other embodiments, the upper section 106f of the sides 106 may not be sloped at the front of the shovel apparatus 100 and the first handle 108 may not be angled and may attach to the sides 106 at a position closer to the front of the shovel apparatus 100.

In the depicted embodiment of FIGS. 1-3, the sides 106 are depicted with a lower section 106e and a lower section 106f as essentially planar with a bend. The bend may be sharp or gradual. In other embodiments, the sides 106 may be rounded to by somewhat cylindrical, may have other sections, etc. The sides 106, in the various embodiments, are shaped to hold the bag or sack 102 open for filling. In addition, the bottom 104 is shaped to be flat, but may also be curved. A flat bottom 104 may be useful to scoop sand off of a flat surface. A curved bottom 104 may be useful to scoop sand or other particulate material in other situations, such as from a pile or where the material has been exposed to weather. The bottom 104, in another embodiment, may have multiple sections, such as a center flat section and side sections that are angled upward, for example, at shallow angle so that the sides 106 may be lifted to form more of an overall rounded shape with flat sections. One of skill in the art will recognize other shapes that will serve to hold open a bag or sack 102 while filling with sand or other flowable particulate material.

The second handle 110 is attached near the back of the sides 106, as depicted in FIGS. 1 and 3. Having the second handle 110 positioned to the back of the shovel apparatus 100 facilitates holding the bag or sack 102 more in an open condition. For example, the shovel apparatus 100 with the second handle 110 extending past the end of the sides may be sized to be about the same length of the bag or sack 102 so that the shovel apparatus 100 holds the bag or sack 102 in a condition to more easily fill the bag or sack 102. The second handle 110 may be inserted in the bag or sack 102 to touch a bottom portion of the bag or sack 102 while the front of the shovel apparatus 100 is near the opening 102a of the bag or sack 102.

The shovel apparatus 100 may be sized so that when the second handle 110 is touching a back portion of the bag or sack 102, the first handle 108 may be inside the bag or sack 102 and near the front of the bag or sack 102 to enable a user to wrap a portion of the bag or sack 102 around the first handle 108. For example, the shovel apparatus 100 may be sized as depicted in FIGS. 1 and 3 so that a portion near the opening 102a of the bag or sack 102 may be wrapped around the bag or sack 102 while a portion of the shovel apparatus 100 protrudes from the bag or sack 102 for scooping sand or other material.

In the depicted embodiment of FIGS. 1 and 2, the second handle 110 of the shovel apparatus 100 is angled upward. For example, the first handle 108 may be angled upward to be grasped by a user through the bag or sack 102 while allowing the portion of the bag or sack 102 below where the user is grasping the second handle 110 through the bag or sack 102 to hang down and be filled while scooping sand or other material.

In the depicted embodiment, the second handle 110 is angled away from the sides 106 at about the same angle as a slope in the lower section 106e, which may help prevent the bag or sack 102 from catching on the sides 106 when the shovel apparatus 100 is inserted in the bag or sack 102. The second handle 110 is depicted above a line of the slope of the lower section 106e and the back edge 106d of the sides 106 have a rounded portion which may decrease catching of the bag or sack 102 on the back edge 106d. In another embodiment, the second handle 110 is positioned with a lower edge closer to or in line with the sloped second of the lower section 106e to reduce catching of the bag or sack 102 on the back edge 106d of the sides 106. Other embodiments of the second handle 110 are described below.

The sides 106 may also be sloped above the second handle 110 to further prevent the bag or sack 102 from catching on edges of the sides 106. As depicted in FIG. 1, the upper section 106f of the sides 106 slope up and away from the second handle 110.

The back edge 104b of the bottom 104 is depicted in FIG. 3 with a notch. The notch in conjunction with the sloping lower section 106e of the sides and the second handle 110 to form an opening for sand to fall through into the bag or sack 102 when sand or other material is scooped into the front of the shovel apparatus 100. In one embodiment, the slope of the sides 106 connect with the notch in the bottom 104 to avoid points that would catch on the bag or sack 102 when the shovel apparatus 100 is inserted in the bag or sack 102.

The first handle 108 may be attached to the sides 106 by rivets, welding, screws, and the like. In the embodiment of the shovel apparatus 100 of FIGS. 1-3, the first handle 108 and the second handle 110 include two attachment points 112 that may be rivets, screws, etc. One of skill in the art will recognize other ways to couple the first handle 108 and the second handle 110 to the sides 106 of the shovel apparatus 100.

The first handle 108 and/or the second handle 110 may be removable from the sides 106 of the shovel apparatus 100. In the embodiment depicted in FIGS. 1 and 3, the shovel apparatus 100 includes a first handle 108 and a second handle 110 that snap into a portion attached to the sides. For example, the handles 108 and 110 may include a button 114 or other protrusion that extends into an opening of a portion coupled to the sides 106. In another embodiment, the handles 108, 110 bolt to the sides 106. In another embodiment, the handles 108, 110 connect with a friction fit. The handles 108, 110 may disconnect from the sides 106 or bottom 104 to allow stacking of shovel apparatuses 100. One of skill in the art will recognize other ways that the handles 108, 110 may be disconnected from the shovel apparatus 100.

In one embodiment, the bottom 104 of the shovel apparatus 100 includes raised portions 116. In one embodiment, the raised portions 116 provide stiffening of the bottom 104. For example, the bottom 104 and sides 106 may be made of a material that may flex and the raised portions 116 may stiffen the flexible material. The bottom 104 and sides 106 may be made of a metal, such as aluminum. For an aluminum, sheet metal, etc. that is thick or stiff enough to not require additional stiffening, the raised portions 116 may be deleted. For an aluminum, sheet metal, etc. that is thinner or has more flex, the raised portions 116 may be included. The bottom 104 and sides 106 may also be made of plastic, a composite, fiberglass, or other non-metallic material, which may be advantageous for weight reduction, cost control, etc. One or more raised portions 116 may be included to stiffen the non-metallic material.

The raised portions 116 are placed at the rear of the bottom 104 and run from rear to front. Placing the raised portions 116 at the back of the bottom 104 instead of the front may allow the front of the bottom 104 to be flat for scooping. Having the raised portions 116 run from back to front instead of from side to side may allow sand or other material to flow into the bag or sack 102 easier than side-to-side ridges. Raised portions 116 may also be placed in the sides (not shown).

Figure 4:
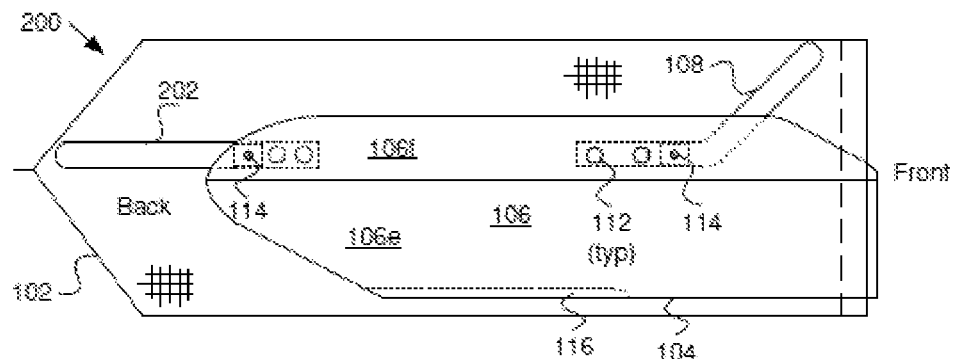
FIG. 4 is a side view further illustrating another embodiment of a shovel apparatus with a handle extending backward.

FIG. 4 is a side view further illustrating another embodiment of a shovel apparatus 200 with a second handle 202 extending backward. The second handle 202 is depicted as extending straight backward from the sides 106. The shovel apparatus 200 of FIG. 4, in one embodiment, may be substantially similar to the shovel apparatus 100 of FIGS. 1-3, except for the second handle 202 position and the shovel apparatus 200 of FIG. 4 may have any or all of the same options and features as the shovel apparatus 100 of FIGS. 1-3. A second handle 202 as depicted in FIG. 4 may extend closer to the bottom of the bag or sack 102 and may facilitate supporting the shovel apparatus 100 to keep a portion of the shovel apparatus 200 extending outside the bag or sack 102. The first handle 108 and second handle 202 are depicted with a button 114 for detachment, but may also be fixed to the sides 106 without being removable.

Figure 5A:
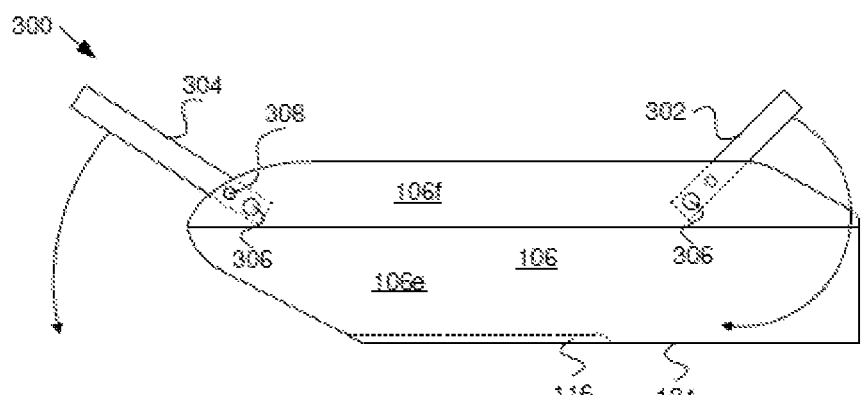
FIG. 5A is a side view illustrating another embodiment of a shovel apparatus with rotatable handles in a useable position.
Figure 5B:
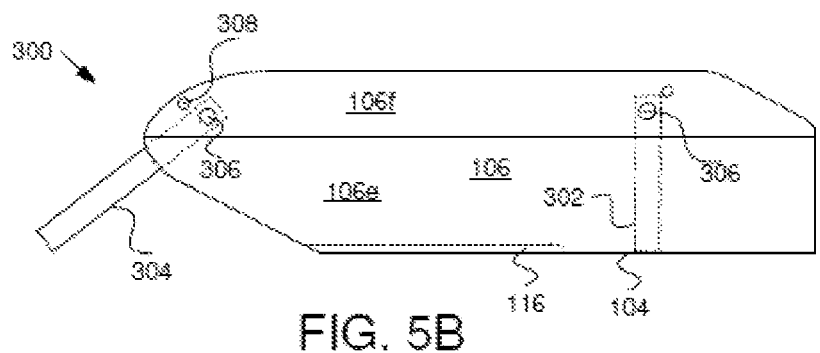
FIG. 5B is a side view further illustrating the shovel apparatus of FIG. 5A with rotatable handles in a collapsed position.

FIG. 5A is a side view illustrating another embodiment of a shovel apparatus 300 with rotatable handles in a useable position. FIG. 5B is a side view further illustrating the shovel apparatus 300 of FIG. 5A with rotatable handles in a collapsed position. The shovel apparatus 300 of FIGS. 5A and 5B, in one embodiment, may be substantially similar to the shovel apparatus 100 of FIGS. 1-3, except for the first handle 302 and second handle 304 being rotatable and the shovel apparatus 300 of FIGS. 5A and 5B may have any or all of the same options and features as the shovel apparatus 100 of FIGS. 1-3. The first handle 302 and second handle 304, in one embodiment, rotate about a pivot point 306 to allow the first handle 302 and second handle 304 to rotate downward, for example, to facilitate a lower profile for storage or to be moved to a position to allow for stacking. The first handle 302 and second handle 304 may snap into position, for example, with a button that locks into an opening 308. Other designs may include a pine, a screw, etc. to retain the first handle 302 and the second handle 304 in a particular position for use or storage.

Figure 6:
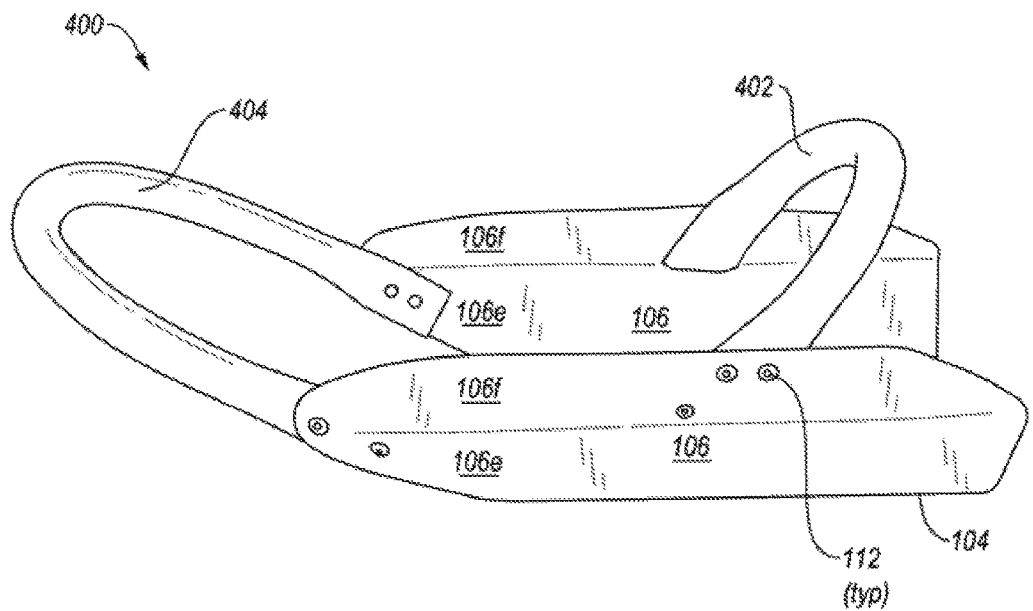
FIG. 6 is a side perspective view illustrating another embodiment of a shovel apparatus with fixed handles.
Figure 7:
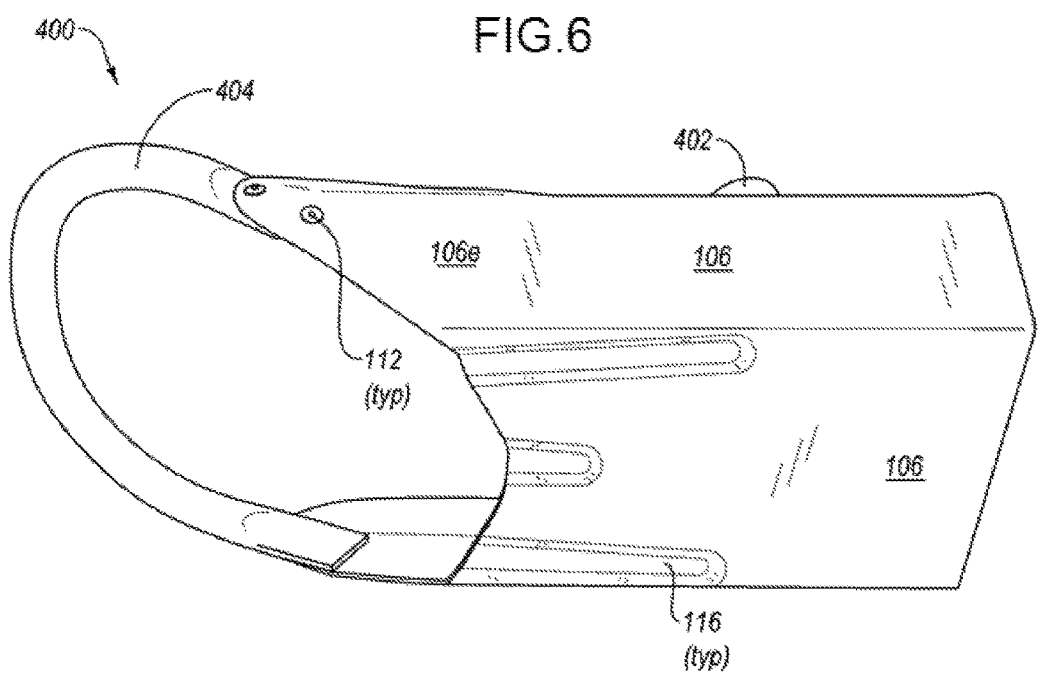
FIG. 7 is a bottom perspective view further illustrating the shovel apparatus of FIG. 6.
Figure 8:
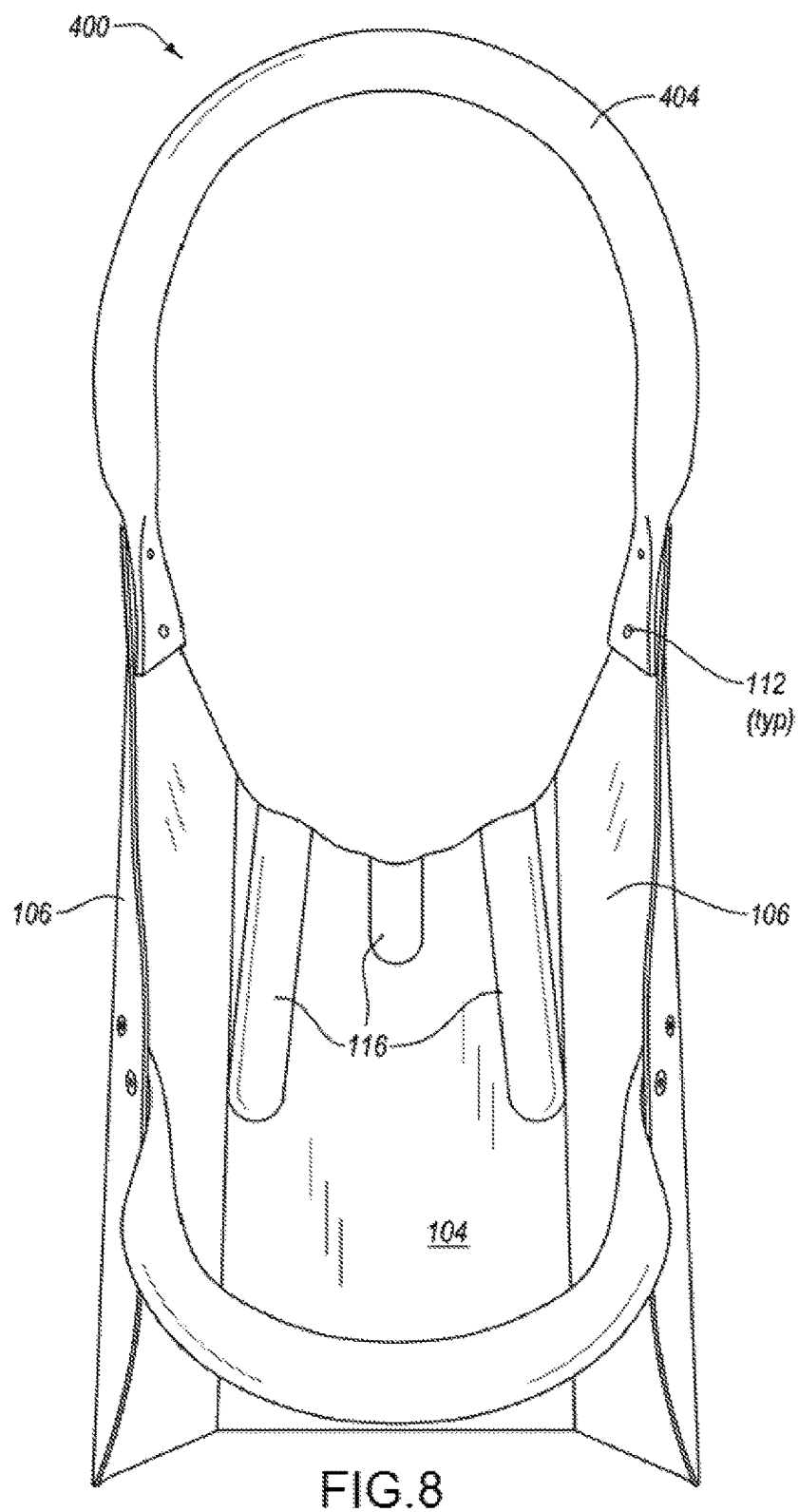
FIG. 8 is a top view further illustrating the shovel apparatus of FIG. 6.
Figure 9:
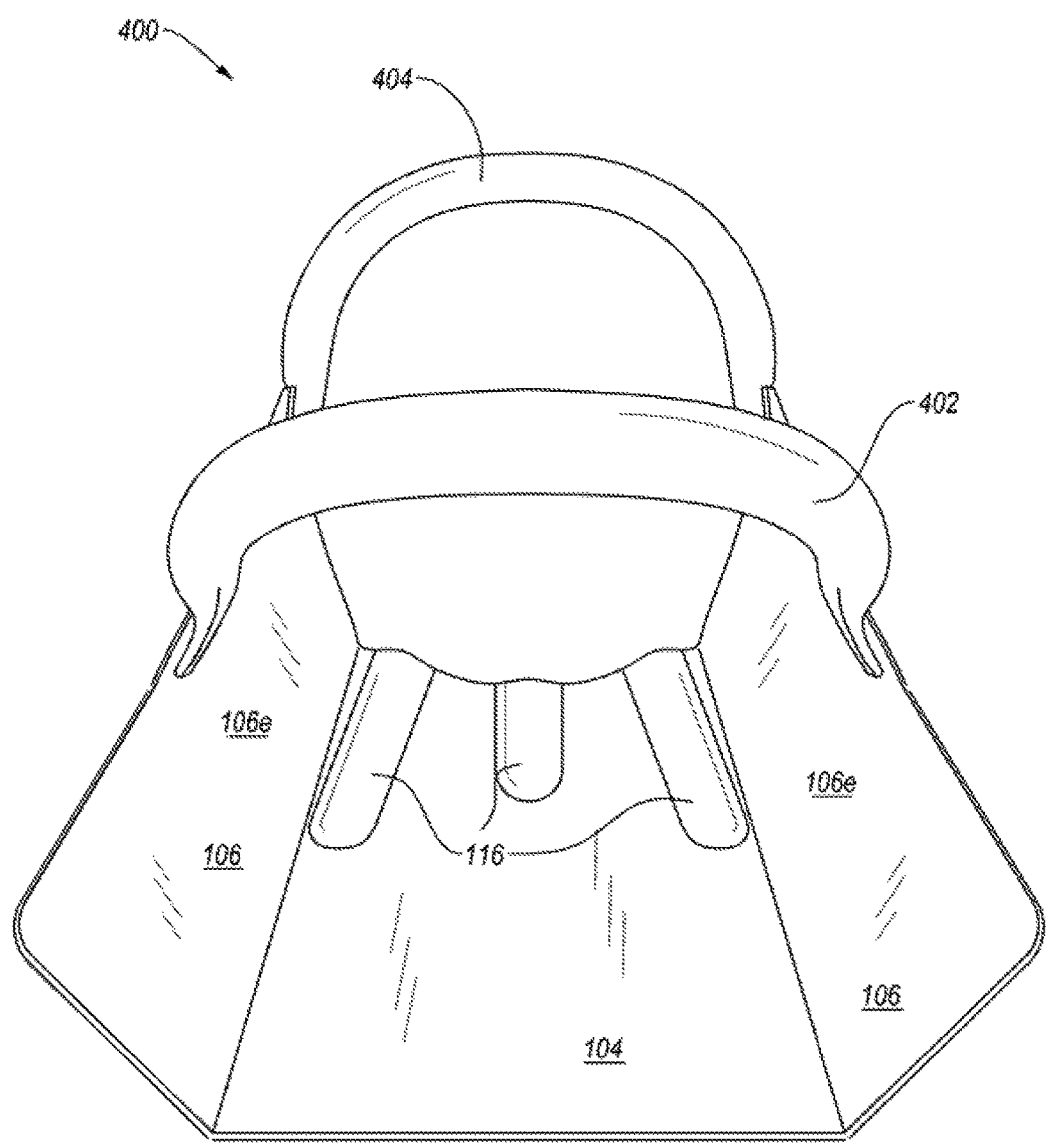
FIG. 9 is an end perspective view further illustrating the shovel apparatus of FIG. 6.
Figure 10:
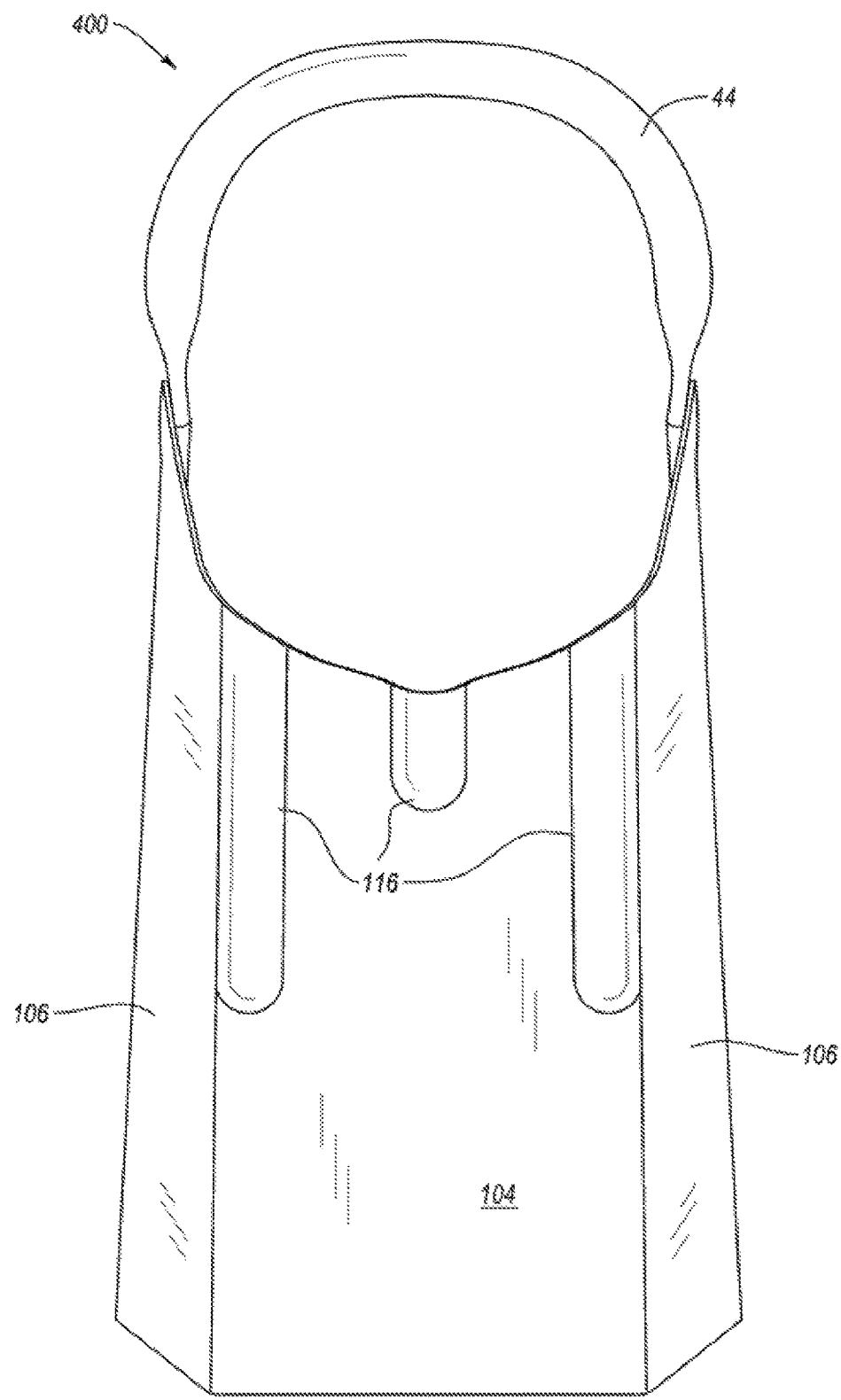
FIG. 10 is a bottom view further illustrating the shovel apparatus of FIG. 6.
Figure 11:
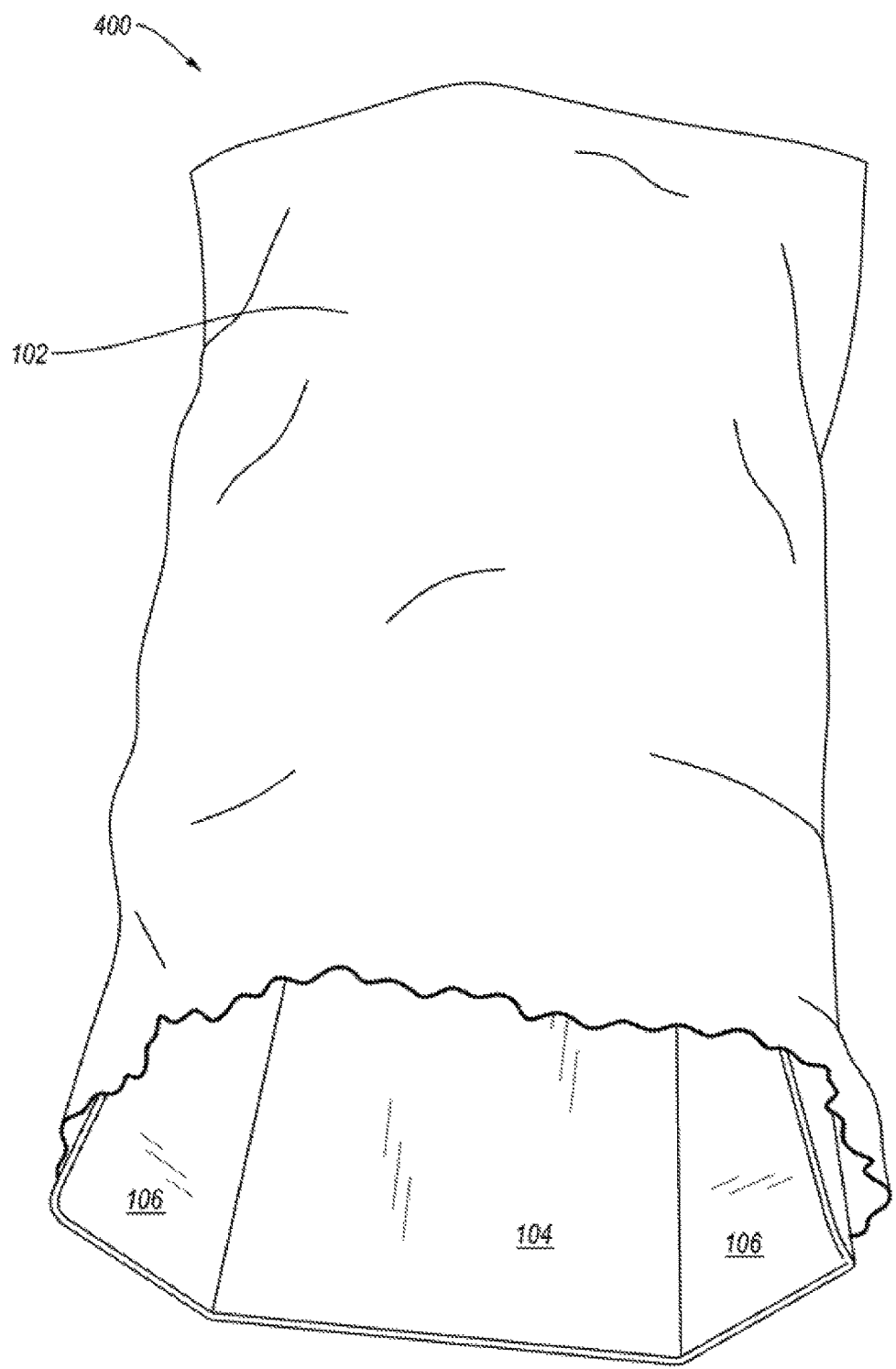
FIG. 11 is an end perspective view further illustrating the shovel apparatus of FIG. 6 inserted in a bag or sack.
Figure 12:
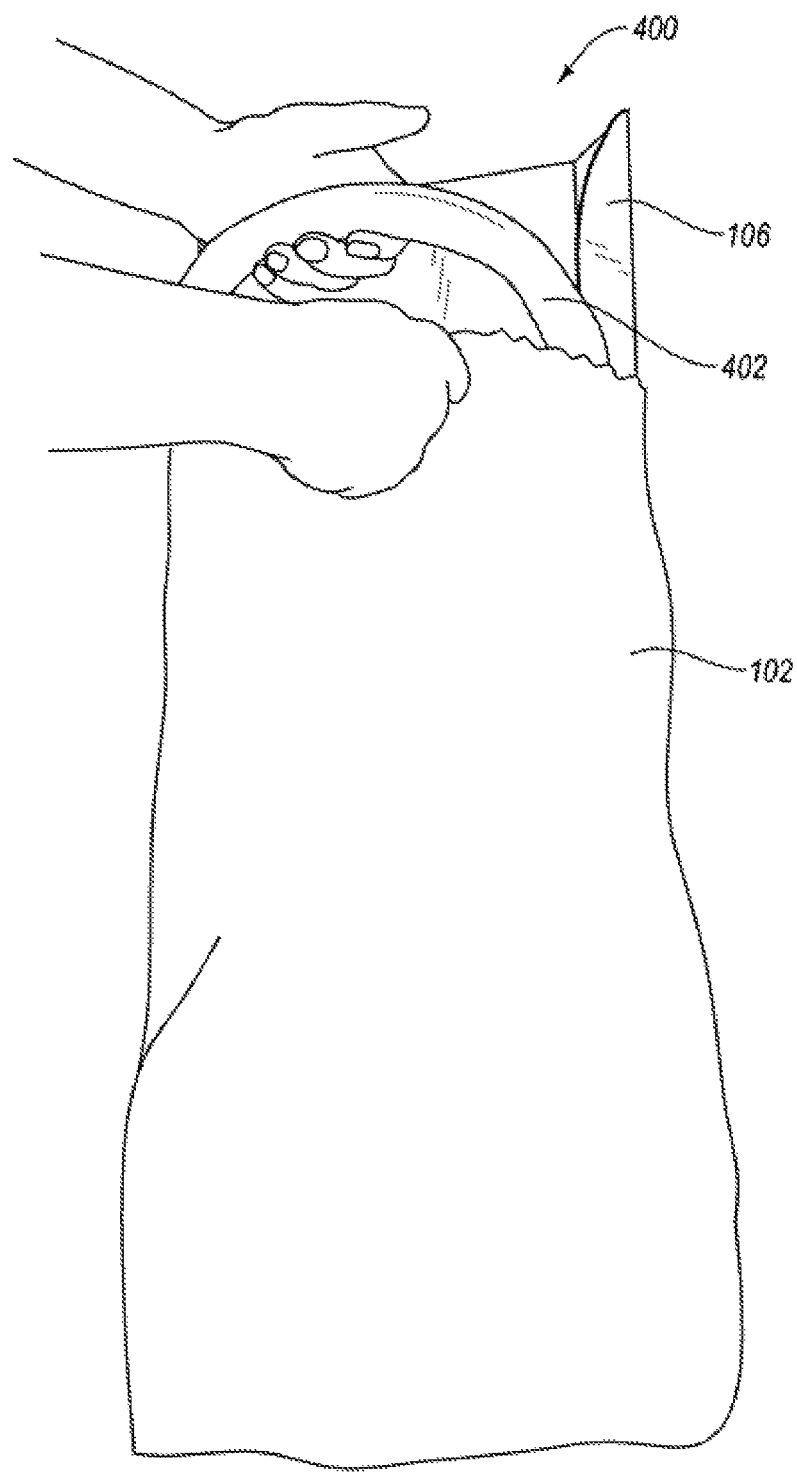
FIG. 12 is a side perspective view further illustrating the shovel apparatus of FIG. 6 inserted in a bag or sack with a person demonstrating insertion.
Figure 13:
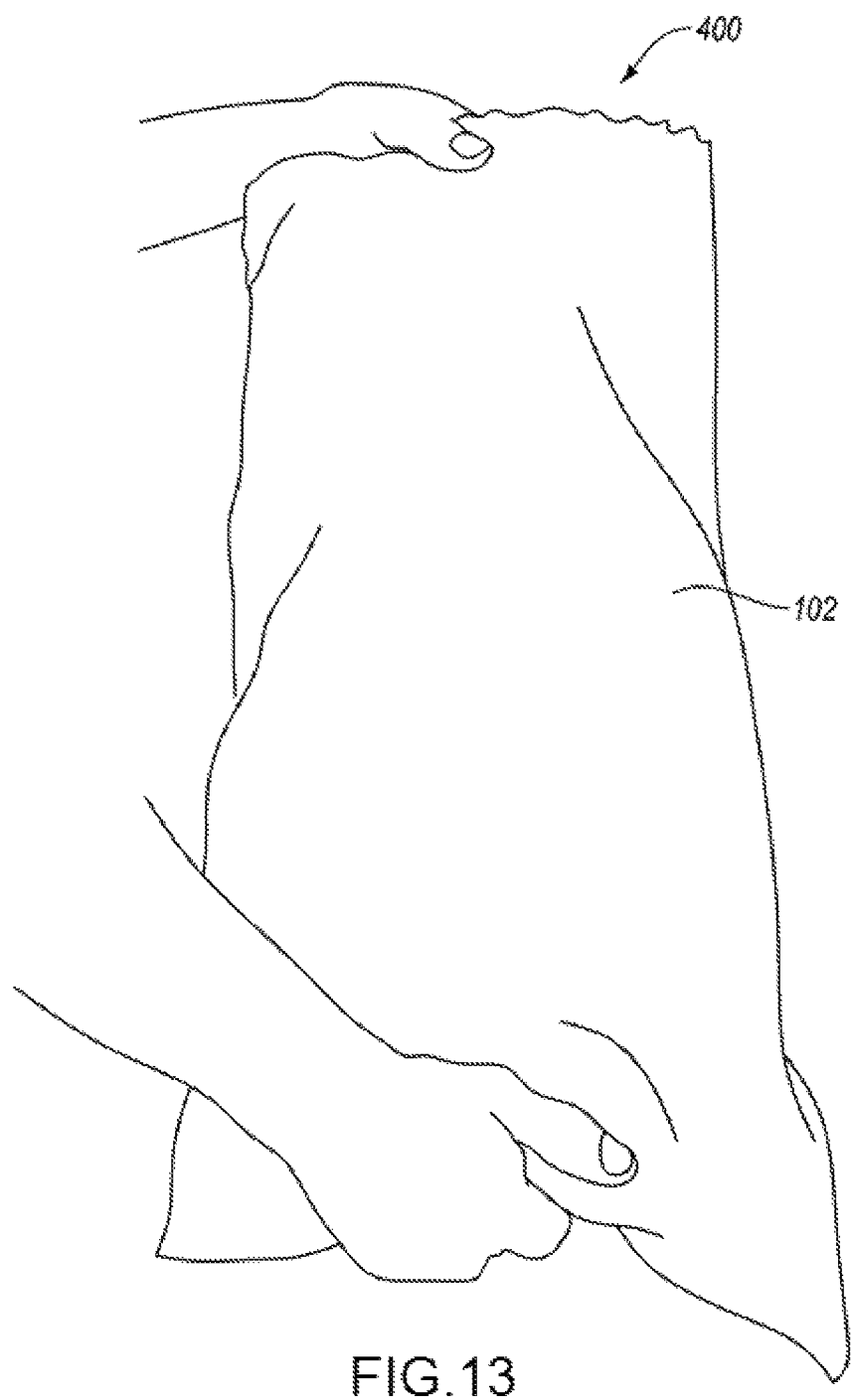
FIG. 13 is a side perspective view further illustrating the shovel apparatus of FIG. 6 inserted in a bag or sack with a person demonstrating grasping the handles of the shovel apparatus through the bag or sack.

FIG. 6 is a side perspective view illustrating another embodiment of a shovel apparatus 400 with fixed handles. FIG. 7 is a bottom perspective view further illustrating the shovel apparatus 400 of FIG. 6. FIG. 8 is a top view further illustrating the shovel apparatus 400 of FIG. 6. FIG. 9 is an end perspective view further illustrating the shovel apparatus 400 of FIG. 6. FIG. 10 is a bottom view further illustrating the shovel apparatus 400 of FIG. 6. FIG. 11 is an end perspective view further illustrating the shovel apparatus 400 of FIG. 6 inserted in a bag or sack. FIG. 12 is a side perspective view further illustrating the shovel apparatus 400 of FIG. 6 inserted in a bag or sack with a person demonstrating insertion. FIG. 13 is a side perspective view further illustrating the shovel apparatus 400 of FIG. 6 inserted in a bag or sack with a person demonstrating grasping the handles of the shovel apparatus 400 through the bag or sack.

The shovel apparatus 400 of FIGS. 6-13, in one embodiment, may be substantially similar to the shovel apparatus 100 of FIGS. 1-3, except for the first handle 402 and second handle 404 are fixed and the shovel apparatus 400 of FIGS. 6-13 may have any or all of the same options and features as the shovel apparatus 100 of FIGS. 1-3.

Figure 14:
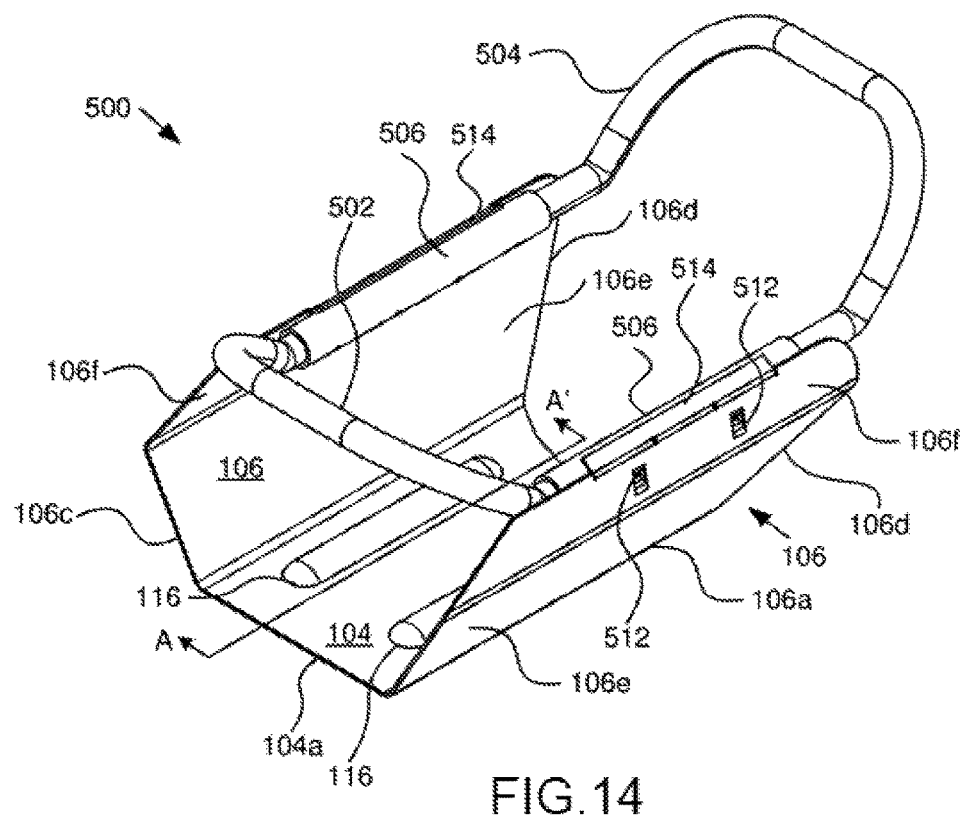
FIG. 14 is a perspective view illustrating one embodiment of a shovel apparatus with detachable handles.

FIG. 14 is a perspective view illustrating one embodiment of a shovel apparatus with detachable handles. The shovel apparatus 500 comprises a bottom 104, sides 106, the raised portions 116 and the like. The sides have the lower section 106e and the upper section 106f, similar to that described as shown above. The shovel apparatus 500 comprises a front detachable handle 502, a back detachable handle 504, a tube section 506 on each side 106, release mechanism 508, securing mechanism 510, raised tabs 512 and top side segment 514, which will be described in more details in FIGS. 15 and 19.

Figure 15:
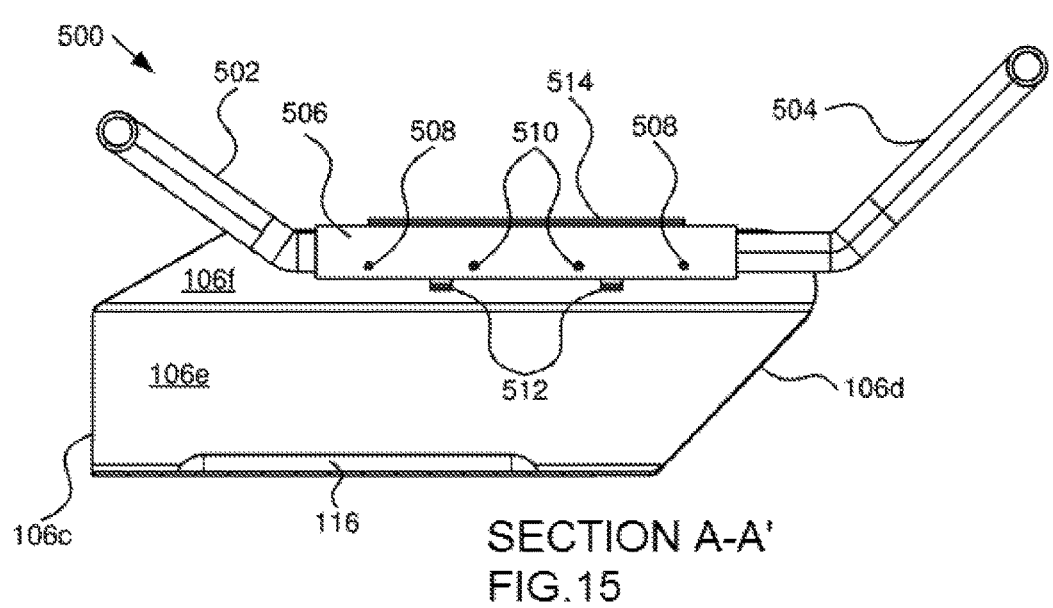
FIG. 15 is a side section view of the shovel apparatus with detachable handles of FIG. 14.
Figure 16:
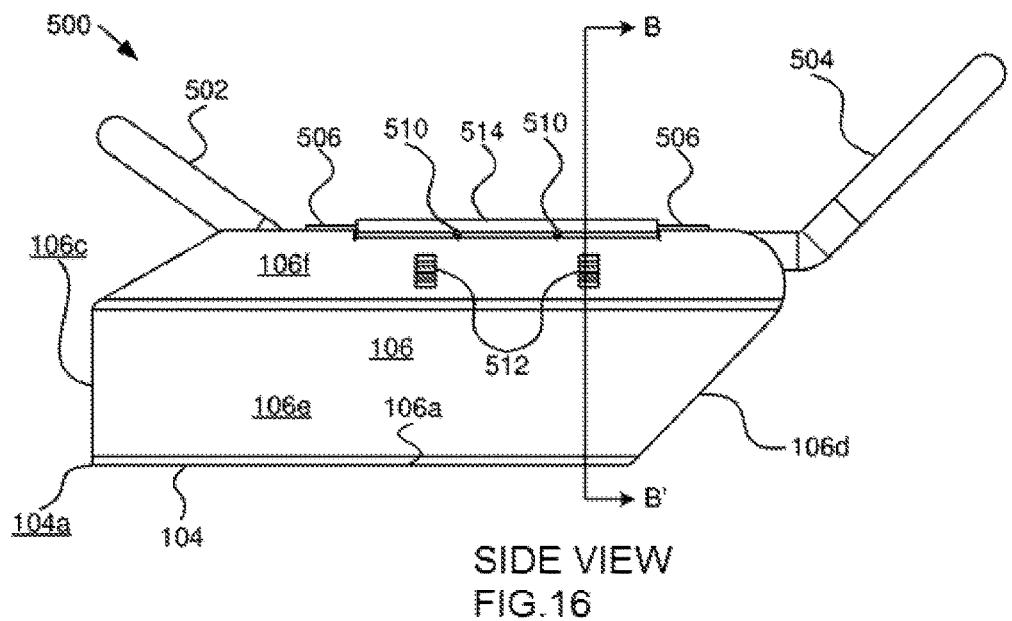
FIG. 16 is a side view of the shovel apparatus with detachable handles of FIG. 14.
Figure 17:
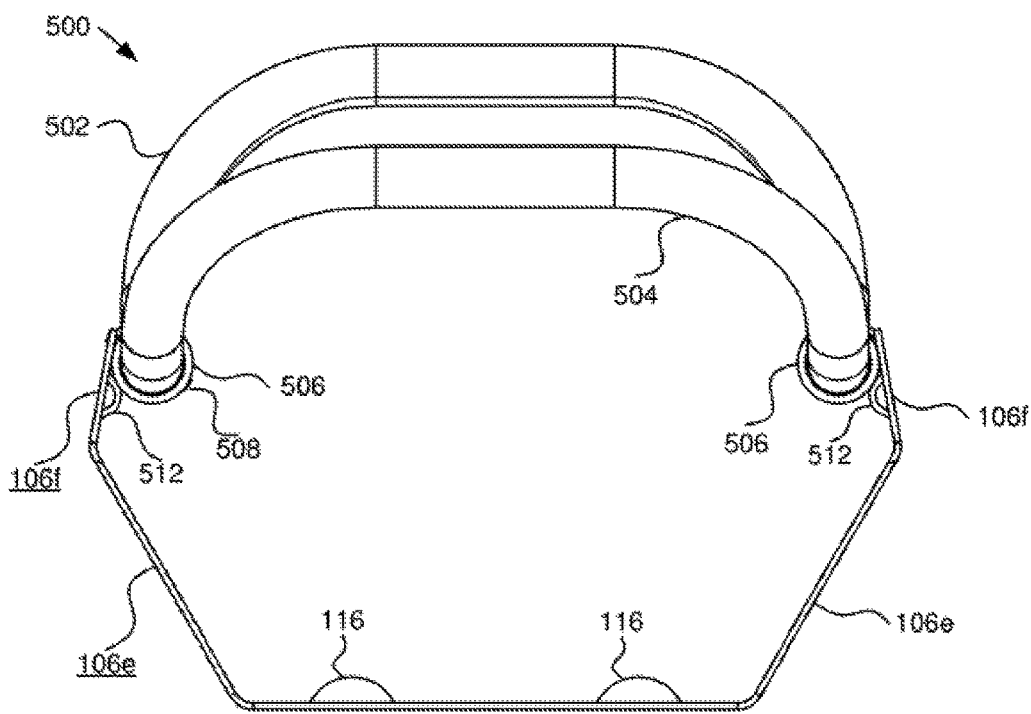
FIG. 17 is an end view of the shovel apparatus with detachable handles of FIG. 14.

FIG. 15 is a side section view along A-A' of the shovel apparatus 500 with detachable handles of FIG. 14. FIG. 16 is a side view of the shovel apparatus 500 with detachable handles of FIG. 14. FIG. 17 is an end view of the shovel apparatus 500 with detachable handles of FIG. 14. FIG. 18 is an end section view along B-B' of the shovel apparatus 500 with detachable handles of FIG. 14. FIG. 19 is an enlarged view of a portion of the shovel apparatus with detachable handles of FIG. 18.

The detachable handles 502, 504 are inserted into the tube section 506 on each side 106. In one embodiment, the tube section 506 is fixed by the securing mechanism 510 onto the upper section 106f or the top segment 514. The securing mechanism 510 may comprise rivets, screws, pins, adhesives or other means to fix the tube section 506 to sides 106 of the shovel apparatus 500.

In addition to the fixed mechanism 510, the raised tabs 512 also provides the structural support for the tube section 506. The raised tabs 512 is connected to the upper section 106f of the sides 106. In one embodiment, the raised tabs 512 are the internally bent portion of the upper section 106f. In another embodiment, the raised tabs 512 are separate from the sides 106 and attached to the upper section 106f of the sides 106 by the fixed mechanism (not shown) such as rivets, screws, pins, adhesives or the like. The raised tabs 512 of the sides 106 is disposed against the tube section 506 of the sides 106. The shovel apparatus 500 further comprises top segment 514 above the upper section 106f the sides 106, and the top segment 514 angles towards the tube section 506 to provide mechanical support for the tube segment 506.

The detachable handles 502, 504 inserted into the tube section 506 have external diameters which conform to the internal diameter of the tube section. In one embodiment, the detachable handles 502, 504 have the same diameter throughout the entire detachable handles 502, 504. In another embodiment, the portion of the detachable handles 502, 504 inserted into the tube section 506 have smaller diameters. When the detachable handles 502, 504 are inserted into the tube section 506, the portion of the detachable handles 502, 504 that transitions to a smaller diameter can be used as a stop.

In one embodiment (as shown in FIG. 15), the detachable handles 502, 504 comprise the releasing mechanism 508 which allows the detachable handle to be locked into the tube section 506 and then release the detachable handles 502, 504, for example, by pressing the releasing mechanism 508. In one embodiment, the releasing mechanism 508 is spring loaded pin which enable a user to press the pin to insert or release the detachable handle 502, 504. In other embodiment, the detachable handle 502, 504 is connected via other means such as a friction fit, a detachable pin, a screw, or the like. Although a cross-section of the detachable handle 502, 504 is shown in round shape, other shapes such as a square cross-section, a rectangular cross-section, an oval cross-section, and the like may also be used.

The present disclosure may be embodied in other specific forms without departing from its essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

The invention claimed is:

1. A shovel apparatus comprising:
    a body comprising:
    a bottom comprising side edges opposite each other, a front edge and a back edge distal to the front edge; and
    a first and second side, wherein each side comprises a first side edge and a second side edge distal to the first side edge, each side fixedly coupled along the first side edge of the side to one of the side edges of the bottom, each side comprising a front located adjacent to the front edge of the bottom and a back located adjacent to the back edge of the bottom,
    wherein a portion of each side attached to the bottom extends upward away from the bottom;
    a first handle coupled to each side,
    a second handle coupled to each side and extending past the back of each side and away from the body,
    wherein the first handle is spaced apart from the second handle and said first handle is connected towards a front of the shovel apparatus to extend away from the bottom of the shovel apparatus, and
    wherein the shovel apparatus is sized to fit in a bag or sack and to hold the bag or sack in an open position for filling and wherein the shovel apparatus has a length less than a length of the bag or sack such that when the shovel apparatus is inserted in the bag or sack, the second handle touches near a bottom of the bag or sack and the first handle is near a top of the bag or sack.

2. The shovel apparatus of claim 1, wherein the second handle extends from each of the first and second sides at an angle between a plane perpendicular to the bottom and a plane parallel with the bottom, wherein each side slopes away from the second handle at an angle substantially similar to the angle that the second handle extends from each side.

3. The shovel apparatus of claim 2, wherein the bottom comprises a notch on the back edge extending toward a center of the bottom, wherein the second handle, the sloping sides and the notch form an opening.

4. The shovel apparatus of claim 2, wherein the handle, the slope of each side and a notch in the bottom are shaped without edges to catch on a bag or sack when the shovel apparatus is inserted in the bag or sack.

5. The shovel apparatus of claim 1, wherein the shovel apparatus is sized to fit in the bag or sack and to hold an opening in the bag or sack in a substantially open position for filling.

6. The shovel apparatus of claim 1, wherein a top of the first handle distal to where the first handle is connected to each side is positioned over the bottom at a position behind a plane perpendicular to the front edge of the bottom and a front edge of each side.

7. The shovel apparatus of claim 1, wherein the front edge of the bottom and at least a portion of a front edge of each side are straight and are aligned along a common plane.

8. The shovel apparatus of claim 1, wherein the bottom is substantially planar.

9. The shovel apparatus of claim 8, wherein the bottom comprises one or more ridges shaped to stiffen the bottom.

10. The shovel apparatus of claim 8, wherein each side comprises a lower section and an upper section, wherein each lower section is adjacent to the bottom and extends away from the bottom at an angle away from a plane perpendicular to where each side attaches to the bottom and each upper section angles toward the plane perpendicular to where each side attaches to the bottom.

11. The shovel apparatus of claim 10, wherein each upper section comprises a front edge that slopes from a front edge of the lower section toward the first handle.

12. The shovel apparatus of claim 1, wherein one or more of the first handle and the second handle detach from the shovel apparatus.

13. The shovel apparatus of claim 1, wherein one or more of the first handle and the second handle rotate to a position near the bottom facilitating stacking of two or more shovel apparatuses.

14. The shovel apparatus of claim 1, wherein the shovel apparatus angles outward from rear to the front to allow a first shovel apparatus to stack inside a second shovel apparatus.

15. The shovel apparatus of claim 1 wherein the first handle frames an opening formed by the bottom and sides for passage of particulate material therethrough when grasped by the user to scoop the particulate material.

16. A shovel apparatus comprising:
a body comprising:
a bottom comprising side edges opposite each other, a front edge and a back edge distal to the front edge, the bottom comprising one or more ridges shaped to stiffen the bottom; and
a first and second side wherein each side comprises a first side edge and a second side edge distal to the first side edge, each side fixedly coupled along the first side edge of the side to one of the side edges of the bottom, each side comprising a front located adjacent to the front edge of the bottom and a back located adjacent to the back edge of the bottom,
wherein a portion of each side attached to the bottom extends upward away from the bottom;
a first handle coupled to each side, and
a second handle coupled to each side extending past the back of each side and away from the shovel apparatus, wherein the second handle extends from each side at an angle between a plane perpendicular to the bottom and a plane parallel with the bottom, each of the first and second handles extend away from the bottom and are connected so the first handle is located forward toward a front of the shovel apparatus, wherein each side slopes away from the second handle at an angle substantially similar to the angle that the second handle extends from each side,
wherein the shovel apparatus is sized to fit in a bag or sack and to hold the bag or sack in an open position for filling,
wherein the bottom comprises a notch on the back edge extending toward a center of the bottom, wherein the second handle, the sloping sides and the notch form an opening,
wherein the front edge of the bottom and at least a portion of a front edge of each side are straight and are aligned along a common plane.

17. The shovel apparatus of claim 16, wherein the bottom is substantially planar, and each side comprises a lower section and an upper section, wherein each lower section is adjacent to the bottom and extends away from the bottom at an angle away from a plane perpendicular to where the sides attach to the bottom and each upper section angles toward the plane perpendicular to where the sides attach to the bottom.

18. The shovel apparatus of claim 16, wherein one or more of the first handle and the second handle rotate to a position near the bottom facilitating stacking of two or more shovel apparatuses.

19. A shovel apparatus comprising:
a body comprising:
a bottom comprising side edges opposite each other, a front edge and a back edge distal to the front edge; and
a first and second side, each side comprising a first side edge and a second side edge distal to the first side edge, each side fixedly coupled along the first side edge of the side to one of the side edges of the bottom, each side comprising a front located adjacent to the front edge of the bottom and a back located adjacent to the back edge of the bottom, wherein a portion of each side attached to the bottom extends upward away from the bottom;
a first handle coupled to each of side, and located forward towards a front of the shovel apparatus and extending away from the bottom, wherein a top of the first handle distal to where the first handle is connected to each side is positioned over the bottom at a position behind a plane perpendicular to the front edge of the bottom and a front edge of the side; and
a second handle coupled to each side and extending past the back of each side and away from the shovel apparatus and extending from each side at an angle between a plane perpendicular to the bottom and a plane parallel with the bottom, wherein each side slopes away from the second handle at an angle substantially similar to the angle that the second handle extends from each side, wherein the shovel apparatus is sized to fit in a bag or sack and to hold the bag or sack in an open position for filling, wherein each side comprises a lower section and an upper section, wherein each lower section is adjacent to the bottom and extends away from the bottom at an angle away from a plane perpendicular to where each side attaches to the bottom and each upper section angles toward the plane perpendicular to where each side attaches to the bottom.

20. The shovel apparatus of claim 19, wherein each upper section comprises a front edge that slopes from a front edge of the lower section to toward the first handle; and the shovel apparatus angles outward from rear to the front to allow a first shovel apparatus to stack inside a second shovel apparatus.

* * * * *